United States Patent [19]

Lee et al.

[11] Patent Number: 5,105,408
[45] Date of Patent: Apr. 14, 1992

[54] OPTICAL HEAD WITH FLYING LENS

[75] Inventors: Neville K. S. Lee, Medfield; James W. Howard, Natick; Patrick K. Tan, Worcester; Walter Hrytsay, Sterling, all of Mass.

[73] Assignee: Digital Equipment Corporation, Maynard, Mass.

[21] Appl. No.: 192,950

[22] Filed: May 12, 1988

[51] Int. Cl.$^5$ .................................... G11B 7/09
[52] U.S. Cl. ........................... 369/44.15; 369/13; 369/44.280; 369/112; 369/118
[58] Field of Search ............ 358/342; 369/13, 32, 369/44.12, 44.15, 44.16, 44.28, 112, 118; 360/114; 350/247, 255; 359/813, 819

[56] References Cited

U.S. PATENT DOCUMENTS

| | | | |
|---|---|---|---|
| 3,913,076 | 10/1975 | Lehureau et al. | |
| 4,178,615 | 12/1979 | Shimooka et al. | 369/118 X |
| 4,322,737 | 3/1982 | Sliwa, Jr. | |
| 4,570,250 | 2/1986 | Gabritsos et al. | 369/112 X |
| 4,609,961 | 9/1986 | Jacobs | 360/114 |
| 4,633,450 | 12/1986 | Gueugnon | 310/114 X |
| 4,654,837 | 3/1987 | Browder | 360/114 X |
| 4,658,279 | 4/1987 | Guckel | |
| 4,688,201 | 8/1987 | Towner et al. | 369/112 X |
| 4,707,814 | 11/1987 | Clements | 369/13 |
| 4,712,203 | 12/1987 | Saito et al. | 369/13 |
| 4,803,674 | 2/1989 | Nakao et al. | 369/13 |
| 4,858,212 | 8/1989 | Takahashi et al. | 369/13 |
| 4,890,178 | 12/1989 | Ichihara | 369/13 X |
| 4,907,211 | 3/1990 | Horimai et al. | 369/13 |

FOREIGN PATENT DOCUMENTS

| | | | |
|---|---|---|---|
| 0112402 | 7/1984 | European Pat. Off. | |
| 3730969 | 3/1989 | Fed. Rep. of Germany | 369/13 |
| 55-122244 | 9/1980 | Japan | 369/13 |
| 57-60566 | 4/1982 | Japan | 369/14 |
| 57-94906 | 6/1982 | Japan | 369/13 |
| 58-118025 | 7/1983 | Japan. | |
| 59-215008 | 12/1984 | Japan | 369/13 |
| 60-261052 | 12/1985 | Japan. | |
| 61-39251 | 2/1986 | Japan | 369/13 |
| 62-204456 | 9/1987 | Japan. | |
| 62-223841 | 10/1987 | Japan. | |
| 2016744 | 9/1979 | United Kingdom. | |

Primary Examiner—Roy N. Envall, Jr.
Assistant Examiner—W. R. Young
Attorney, Agent, or Firm—Fish & Richardson

[57] ABSTRACT

A micro-objective lens is carried on an air bearing slider with an optical passage through which the lens focuses an energy beam onto a spot on an optical data storage medium. The slider accomplishes automatic focusing. An RF coil is affixed to the slider facing the storage medium and surrounding the beam axis. The proximity of the coil lowers power switching requirements.

24 Claims, 4 Drawing Sheets

OPTICAL HEAD WITH FLYING LENS

Cross Reference to Related Application

The present application is related to copending application Ser. No. 192,953 filed the same day as this application by Neville K. S. Lee entitled "Low Mass Optical Head System", assigned to the same assignee as the present application no pending and incorporated herein in its entirety.

BACKGROUND OF THE INVENTION

The present application is related to the head design for an optical data storage system.

The term "optical" as used herein is intended to apply to any directed energy beam system including, for example, visible light, infrared radiation or electron beam.

Realizing the full potential of high density optical storage depends on optimal head design. Optical storage systems such as magneto-optical (MO), write once read many (WORM) and compact disk (CD ROM) all depend on precisely positioning an optical head to train a laser beam on a nominally selected track. The optics, laser transmitter/detector, auto focusing and fine tracking mechanisms are carried on a linear or rotary actuator. In MO data storage systems, the actuator, typically an electromagnetic mechanism, positions an optical head over the storage track portion of an MO disk. The head comprises the laser diode, optics, detectors, focus and fine tracking actuators and servo electronics, which collectively perform the reading and writing operations. Typically, writing onto an MO disk requires a two-pass operation in which the track or sector on which data is to be written is first erased. In the erase cycle, an externally applied magnetic field is established in a direction normal to the disk. The external field is typically provided by energizing a fixed electromagnetic coil disposed on the opposite side of the disk from the objective lens. The coil is usually elongated to cover the stroke of the head. Laser-heated domains to be overwritten are returned to a single orientation under the influence of the external field. After the erase cycle, the external field is reversed and the laser beam is pulsed to write data by selectively reversing the polarity of domains where necessary. The erase cycle significantly reduces disk drive performance by adding one full latency cycle to the writing process.

In present optical storage devices, focusing and fine tracking operations are often accomplished by a 2-degree-of-freedom, miniature voice coil actuator located in the optical head. In this method, which requires a closed-loop servo system, a portion of the light reflected off of the disk is directed onto an astigmatic sensor. Focus and track error signals generated by the sensor are fed back as control signals to the voice coil actuator. The focus and fine-track actuator mechanisms encumber the integrated head with compliant components which limit its tolerance for high accelerations accompanying fast seeks. A single actuator performing both functions also instigates cross coupling.

In addition, the mass of present optical heads, due largely to the weight of the objective lens, limits acceleration sensitive access times.

SUMMARY OF THE INVENTION

One general aspect of the present invention is automatically maintaining the focusing optics or objective lens at a prescribed height close to the surface of the optical data storage medium. To accomplish this, the objective lens is preferably mounted on an air bearing slider flexibly connected to the actuator arm.

For magneto-optical applications, a miniature electromagnetic coil joins the focusing optics on the air bearing slider connected to the actuator arm. The optical axis of the converging beam passes nominally through the center of the coil on its way to the optical storage medium. The coil is preferably elongated in the cross track direction. Locating the coil on the air bearing slider brings it close to the recording medium, thus lowering the power required to establish the desired external magnetic bias field and allows the coil to be small and lightweight.

In a preferred embodiment, the coil is a printed microcircuit carried on a surface of the slider facing the medium. The slider is preferably modified to carry a block of silicon or other suitable crystalline material in which a tapered aperture accommodating the converging beam, is formed by means of anisotropic preferential etching. The flat coil encircles the smaller opening or exit pupil on the side of the block facing the storage medium.

The coil can be energized at high frequencies to produce a modulated bias field for writing data in one of two ways. First, a continuous wave (CW) laser can be employed to produce a continuous beam of thermal energy such that the writing is initiated by modulating the field. Alternatively, a pulsed laser beam can be used alone or in combination with the bias field.

Placing a miniature lens on the air bearing slider allows the focus to be maintained without a focusing actuator and servo. In addition, this configuration decouples the focus and fine tracking functions, thus eliminating troublesome cross-coupling. Furthermore, miniaturizing the objective lens lowers its mass and the mass of the reflector thereby allowing the seek time to be reduced while making the optical package more compact and reducing the profile of the head assembly thereby enabling multiple-platter optical disk drives.

BRIEF DESCRIPTION OF THE DRAWINGS

The drawings are briefly described as follows.

DETAILED DESCRIPTION

The specific embodiment of the invention described herein illustrates an application of the invention to magneto-optical disk technology. The invention, however, has aspects which are applicable to all optical data storage systems. The described embodiment is designed for a linear actuator, but the invention is compatible with rotary actuators, which may be preferred in certain applications.

Figure 1:
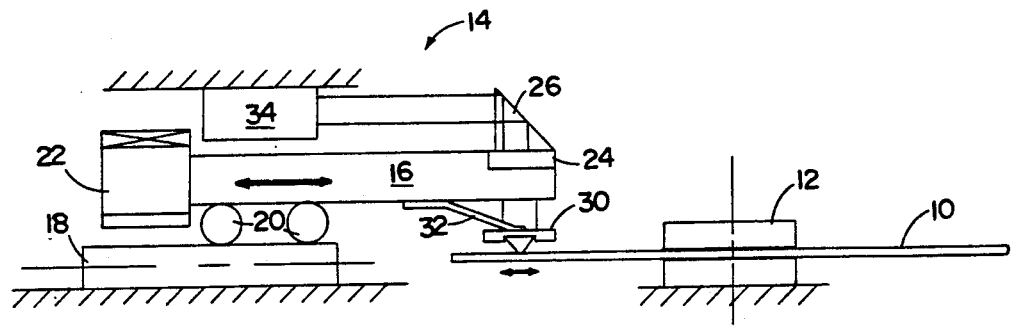
FIG. 1 is a schematic diagram of an optical head system according to the invention.

As shown in FIG. 1, a magneto-optical disk 10 is mounted on spindle 12 for continuous rotation at a constant angular velocity. The optical head system 14 comprises an actuator carriage or arm 16 which translates on fixed rails 18 radially aligned with the disk 1. Carriage 16 is moved back and forth on bearings 20 by means of an electromagnetic linear actuator 22. The outer end of the carriage 16, thus cantilevered from the bearings 2, carries a fine tracking mechanism 24 on which a 45° folding reflector 26 (prism or mirror) is mounted. In addition, the arm 16 carries, at its outer end, an articulated air bearing slider assembly 30, attached to the arm 16 by means of a resilient flexure hinge 32. The air bearing slider 30 and reflector 26 are optically aligned with a remotely located stationary module 34 containing laser transmitter/detector, collimator optics and electronics.

Figure 2:
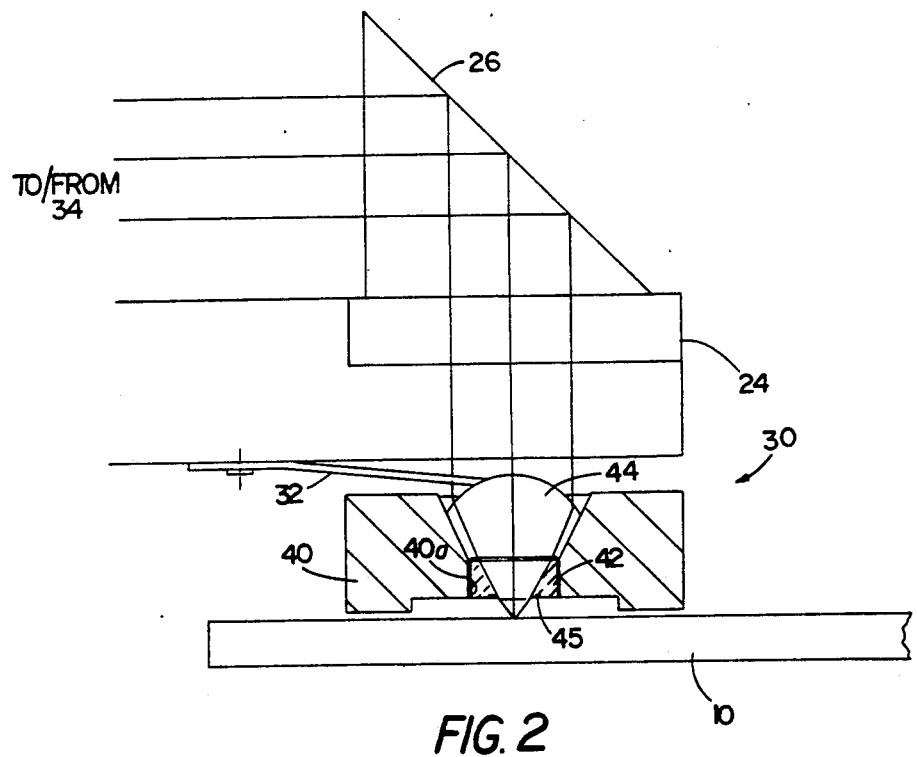
FIG. 2 is a schematic sectional view of the optical head of FIG. 1.
Figure 3:
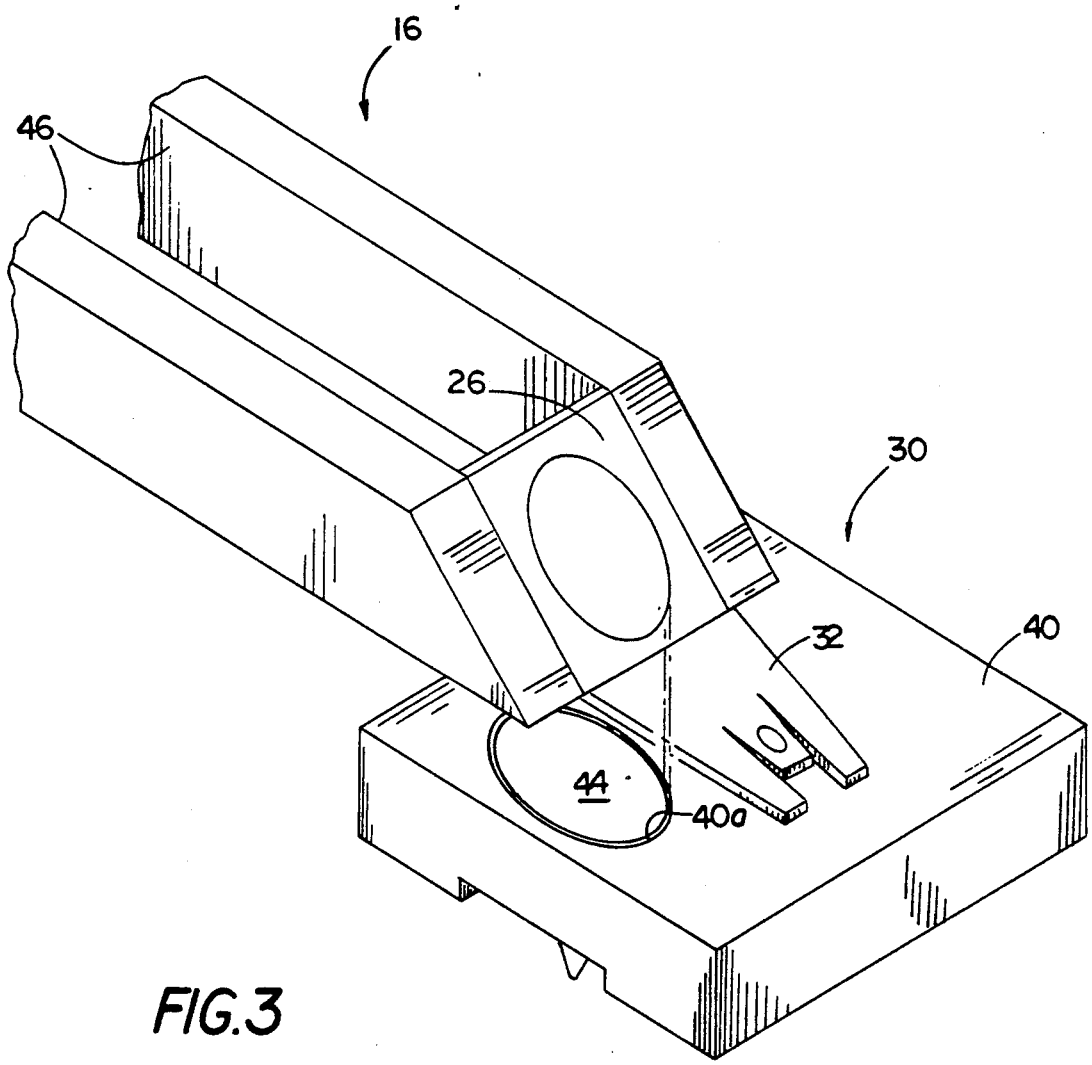
FIG. 3 is a schematic perspective view of an embodiment of the head of FIG. 2 without the actuator carriage.

As shown in FIGS. 2 and 3, the air bearing slider assembly 30 includes a slider base 40 having an optical passage in the form of an aperture 40a occupied by a miniature coil assembly 42 beneath a small diameter, short focal length, aspheric singlet, micro-objective lens 44. A printed circuit coil 45 is defined on the bottom face of the assembly 42 around the beam exit aperture.

As shown in FIG. 3, the flexure hinge 32 is attached approximately at the center of the upper surface of the slider body with the aperture 40a for the objective lens and coil positioned alongside the flexure hinge 32. As shown in FIG. 3, the arm 16 may comprise a pair of spaced parallel rails 46 forming a movable slot in which the fixed opto-electronic module 34 can be suspended to intercept the beam axis from reflector 26.

Figure 5:
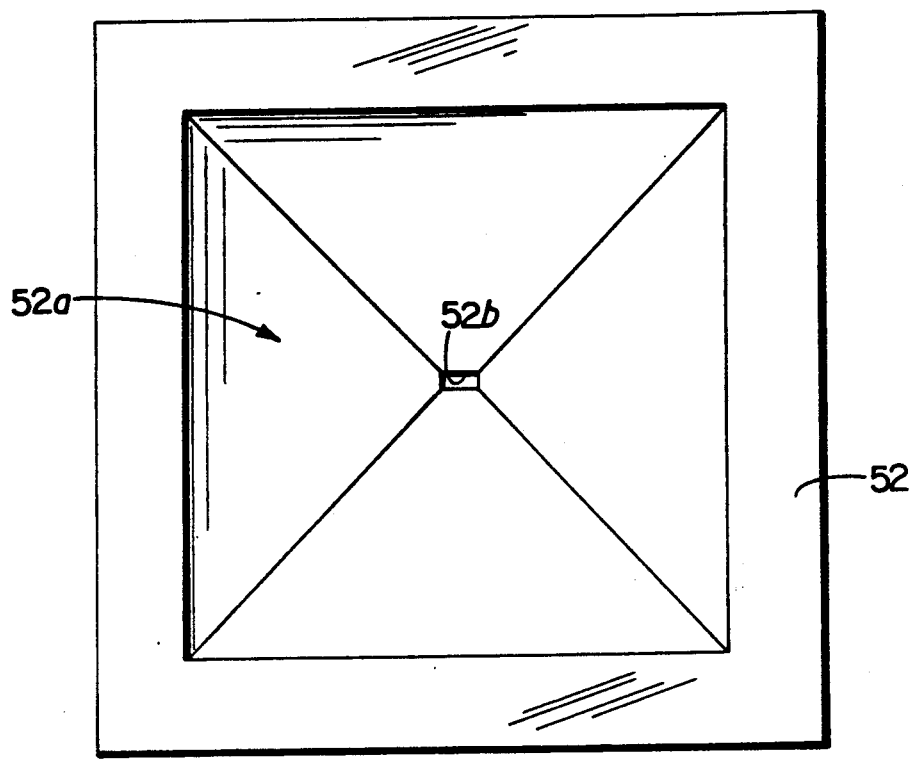
FIG. 5 is a top schematic view of the coil body of FIG. 4 illustrating the tapered recess.
Figure 6:
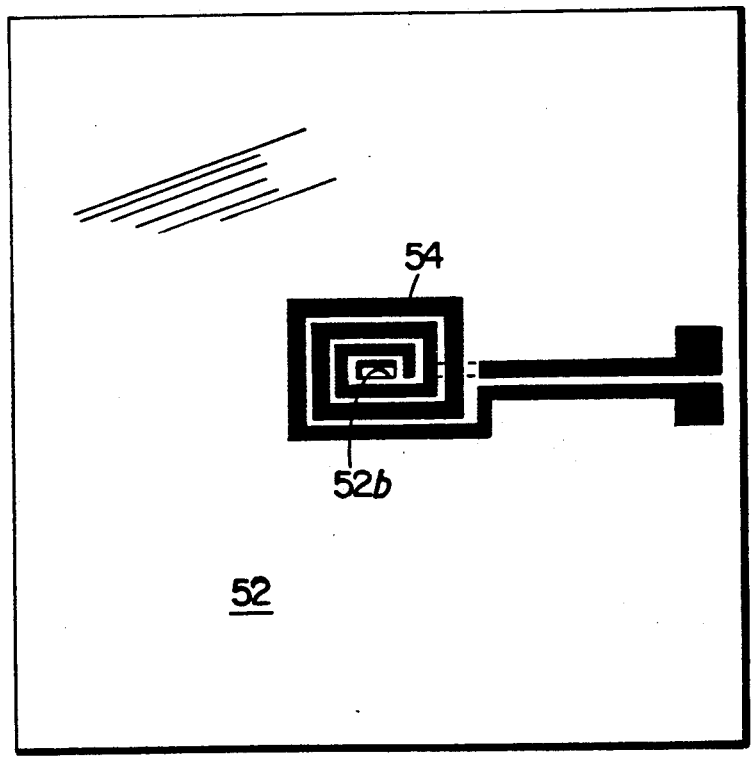
FIG. 6 is a bottom schematic view of the coil body of FIG. 4 showing the coil.
Figure 4:
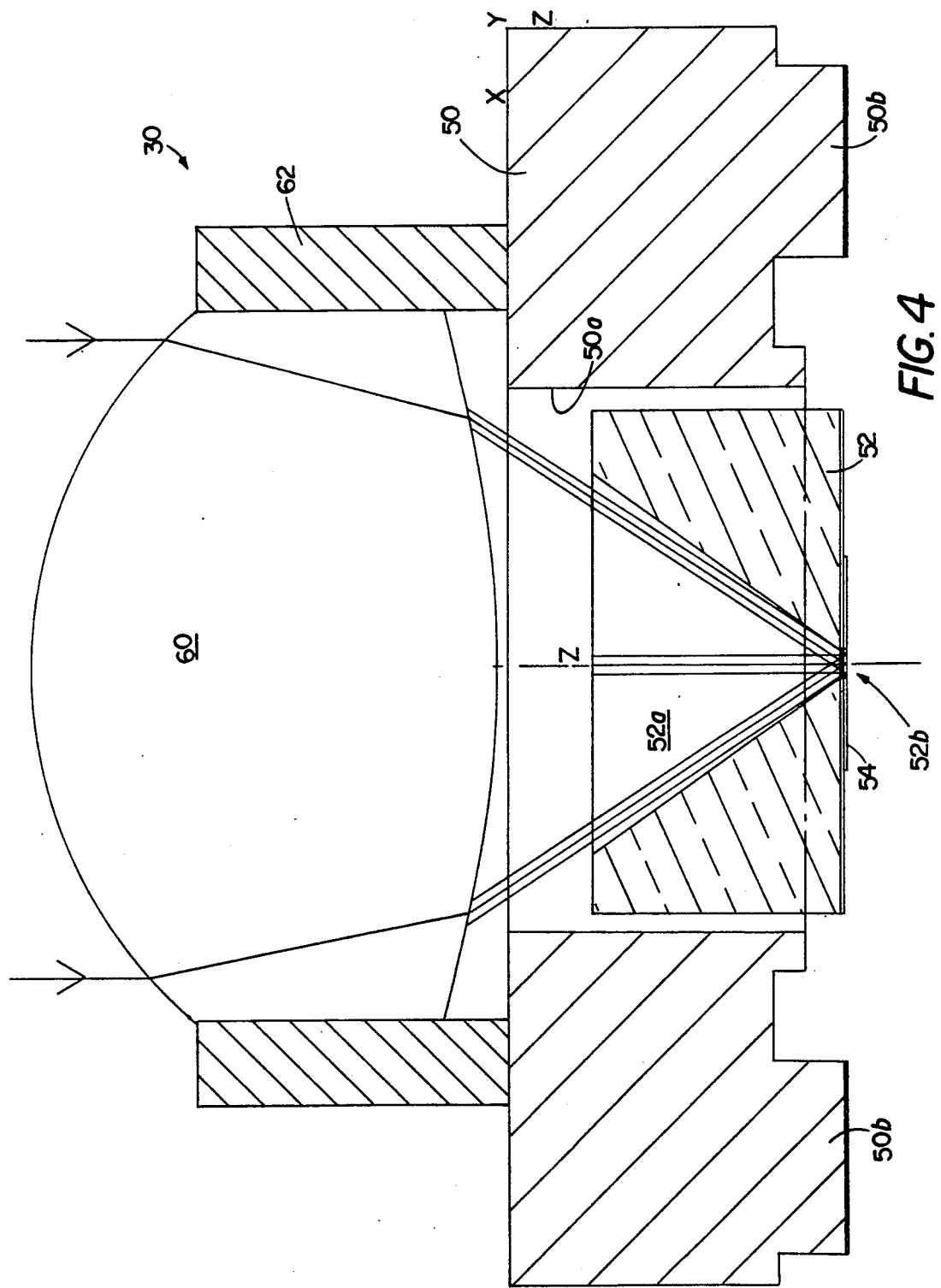
FIG. 4 is a sectional schematic view of another embodiment of the air bearing slider of FIG. 1 carrying the objective lens and coil.

In the embodiment of FIGS. 4-6, a modified slider body 50 has a rectangular aperture 50a in which a rectangular coil block 52 is cemented. The coil block 52 has a tapered recess 52a intersecting the lower surface of the block to form an exit aperture 52b. The underside of the coil block 52 carries a substantially flat printed circuit coil 54 (FIGS. 4 and 6) arranged coaxially with respect to the nominal beam axis and the center of the exit aperture 52b. The coil block 52 is cemented in place in the aperture 50a (FIG. 4) in the slider body 5 so that the bottom surface of the coil block 52 is approximately flush with the outer rails 50b of the slider body. A glass molded aspheric singlet micro-objective lens 60 is mounted in an annular setting 62 coaxial with respect to the coil block 52 such that the nominal optical axis of the objective lens 60 passes substantially through the center of the exit aperture 52b.

As shown in FIG. 4, the converging beam from the micro-objective lens passes through the coil block 52. By changing the angle of the reflector 26, as indicated in FIG. 4, the beam axis and thus the position of the focal point with respect to the exit aperture 52b can be altered to select a particular track. Fine tracking is thus accomplished by tilting the reflector 26. Ideally, the reflector 26 is rotated slightly about the center of the objective lens. In this way, a number of adjacent tracks, e.g., +/−20 to 40, can be accessed by fine tracking without changing the coarse position of the actuator 16. To accommodate the fine tracking excursion of the beam, the coil 54, recess 52a and exit aperture 52b should be slightly elongated in the cross-track direction. Elongating the RF coil in the cross-track direction accommodates a field of view of several tens of tracks thereby allowing localized micro-tracking to be accomplished without changing the radial position of the head. Fine tracking can also be accomplished alternatively or additionally by manipulating an optical element in the stationary unit 34 as disclosed in the aforementioned copending application.

The RF coil mounted in the air bearing slider can be fabricated by printed microcircuit techniques and may comprise a coplanar spiral or multi-layer coil of interconnected parallel, coplanar spiral windings. The coil preferably contains relatively few turns so that its inductance and resistance are low. The low inductance allows the coil to have the wide bandwidth needed to achieve fast-switching time while the low resistance makes the device power-efficient. This configuration allows the polarity of the magnetic field produced by the coil to be modulated at the data transfer rate to eliminate the need for an erase cycle.

The presently preferred material for the apertured coil block 52 (FIGS. 4-6) is silicon subjected to anisotropic preferential etching. A monocrystalline wafer of pure silicon 15-20 mils thick is cut with a crystal orientation [100]. Next, the crystal is etched with a conventional etchant along the [111] plane by appropriate alignment of a suitable rectangular mask. The desired result, as illustrated in FIG. 5, is a rectangular pyramidoidal recess having four sides which each make an angle of 35.26° [arctan $(1/\sqrt{2})$] with respect to the normal axis. Because the sides all make the same angle, the only perfect rectangular pyramid would be a square based one, with the result being a square exit aperture. To elongate the exit aperture for track selection, imagine one side of the pyramid being shifted laterally so that the imaginary vertex becomes a line. Even though the mask is only slightly elongated (i.e., out-of-square), the intersection of the pyramidoid and a horizontal slicing plane (i.e., the lower face of the block) grows more and more elongated toward the apex line. Thus, the exit aperture is a more radically elongated rectangle than the mask pattern, depending on the thickness of the block.

The overall size of the rectangular exit aperture 52b in the bottom of the block 52 is also determined by the thickness of the block 52. The thickness of the block and aspect ratio of the rectangle may be varied to accommodate the dimensions of the coil 54 as well as to provide access to a given number of tracks. The converging, conical beam itself as shown in FIG. 4 passes through the pyramidoidal recess etched in the silicon block. The beam convergence angle (with respect to normal) is preferably anywhere from about 30° up to about 35° in the presently preferred embodiment.

In operation, aerodynamic lift is generated from the interaction between the air bearing slider 30 and the spinning disk 10. This lift is counteracted by an equal and opposite spring force from the flexure hinge 32 thereby allowing the air bearing slider to passively maintain both the micro-objective lens and the RF coil at a prescribed flying height from the disk surface.

Data is written into the disk by illuminating the recording medium with a laser from the stationary optics package 34 (FIG. 1) while modulating the current through the RF coil at high speed. Data can be written, erased or overwritten in several ways. First, a CW laser can be employed to produce a continuous beam of thermal energy such that writing, erasing or overwriting is initiated by virtue of the magnetic bias field modulation itself. Alternatively, a pulsed laser beam can be used alone or in combination with the bias field. Because of the coil's reduced size and proximity, it can be rapidly energized with current flowing in the proper direction to produce a rapidly varying magnetic field of sufficient strength. The power-efficient, fast-switching coil can be driven by a relatively modest power supply.

Thus, the invention provides a means of eliminating the erase cycle. Because the objective lens and the coil are on the same side of the disk, the system of the present invention is compatible with double-sided disks.

This arrangement also eliminates the need for a focus servo since the air bearing slider can position and maintain the distance between the micro-objective lens and the MO disk to an accuracy which is within the depth of focus of the lens. The compliant nature of the flexure in the focus direction allows the air bearing slider to accommodate axial disk runout. Lens spacing accuracies of better than 0.1 micron are projected. Since the depth of focus of the micro-objective lens is approximately +/−0.8 micron (32 micro inches), the air bearing slider can adequately perform the necessary auto focus function.

The focal length of the objective lens, the numerical aperture defining the entrance diameter of the objective lens, and the collimated laser beam diameter incident to the lens are related by the following equation:

$$D = 2f \times NA$$

where
D = beam diameter
f = lens focal length
NA = numerical aperture.

The focused spot size produced by the lens and the depth of focus are determined by the numerical aperture. A small NA yields a large depth of focus and a large spot. Conversely, a larger NA produces a smaller spot but reduces the depth of focus. In the preferred embodiment, the NA is approximately 0.55 which yields a small spot and an adequate depth of focus. Moreover, 0.55 is approximately the largest NA currently practical in a single-element, molded, aspheric lens. Larger NA's require steeper curvatures which are difficult to fabricate. It is anticipated, however, that future advances in fabrication technology may give rise to aspheric singlets with larger NA's. A somewhat larger NA may be desirable to reduce the spot size so long as the depth of focus is not reduced to a level close to or beyond the auto focus capability of the slider.

Since the aperture and thus the overall width of the objective lens need only be large enough to encompass the beam, the beam diameter should be as small as feasible to reduce the lens mass. However, the lower limit on the beam diameter is determined by the divergence of the collimated beam as it travels from the stationary module 34 to the objective lens (FIG. 2), and the requirement that the beam be centered on the objective lens. If the beam is too small, diffraction will cause its width to grow excessively as it travels from the stationary module to the objective lens. Moreover, a small misalignment between the laser beam and the objective lens will result in excessive light loss if the beam is too small.

The focal length of the objective lens determines the distance between the medium and the lens (the working distance). If the focal length is too short, then the working distance will be too small. If the focal length is too long, then the lens will be mounted too high on the air bearing slider, a potentially unstable configuration. Moreover, a long focal length objective increases the profile of the optical head and limits the minimum feasible disk separation in multiple disk configurations.

The foregoing considerations and the equation relating the three parameters result in the following approximate desirable ranges on the objective focal length, objective NA, and collimated laser beam diameter in presently preferred embodiments:

Focal length = 1–3 mm, preferably less than 2 mm (preferred embodiment 1.45 mm)

Numerical aperture = 0.50–0.65 (preferred embodiment 0.55)

Beam diameter = 1–3 mm (preferred embodiment 1.60 mm) A glass aspheric singlet of the preferred specifications has a mass of less than 35 milligrams. It appears to be generally preferable for the focal length of the lens to be about the same as the beam diameter.

The invention is usable with a removable or nonremovable MO disk. The preferred system, however, is designed for use with a nonremovable MO disk. In a dust-free housing, the MO disk can be protected by a very thin overcoat. Prior MO systems have used large objective lenses in combination with disks bearing relatively thick protective overcoats which require long working distances. The use of an air bearing slider to carry the objective lens allows the working distance between the objective lens and the magnetic layer to be reduced. Based on these considerations, the focal length of the lens for the present invention can be less than in prior systems. The short focal length objective used in this system permits miniaturization of the entire optical head resulting in a more compact, lightweight and reliable package.

The flying height stability requirement is much less severe in the present invention than in a conventional magnetic disk drive. In contrast to magnetic disk drives, the optimal height at which the air bearing slider flies is determined by aerodynamic not data density considerations. Thus, in the present invention, the air bearing system inherently can operate at a more reliable, stable flying height.

As an alternative to the slider assemblies illustrated herein, the slider body can be integrated with the coil or with the objective lens or both. For example, a slider can be made of optically transparent material with the coil photolithographically defined on one side. In optical data storage systems which do not require external magnetic fields, the air bearing slider mounted objective lens can be used without the RF coil. Thus, the invention is applicable, for example, to CD ROM technology. In addition, while the invention is illustrated in a linear actuator, it is equally applicable to rotary actuator systems.

These and other embodiments are included within the claims.

What is claimed is:

1. An optical data storage system, comprising
an optical data storage medium,
a movable optical head for delivering a directed energy beam to a spot on the storage medium, including
a slider flexibly suspended above said medium on an air bearing,
micro-focusing optics mounted on said slider, said slider having an optical passage defined between said optics and the storage medium, said optics being oriented to focus the energy beam through said optical passage onto a spot on the storage medium, said slider maintaining the effective distance between said optics and said storage medium to achieve auto focusing, said optical passage being a tapered pyramidoidal recess formed in said slider accommodating a converging beam from said optics, said tapered pyramidoidal recess having flat sides.

2. The system of claim 1, wherein said optics has an optical axis, each side of said recess making an equal angle with respect to said optical axis.

3. The system of claim 2, wherein the larger end of the tapered recess has a rectangular cross-section shaped like a slightly elongated square and the exit opening at the narrow end of the tapered recess is a more elongated slot-shaped rectangle.

4. An optical data storage system, comprising
an optical data storage medium,
a movable optical head for delivering a directed energy beam to a spot on the storage medium, including
a slider flexibly suspended above said medium on an air bearing,
micro-focusing optics mounted on said slider, said slider having an optical passage defined between said optics and the storage medium, said optics being oriented to focus the energy beam through said optical passage onto a spot on the storage medium, said slider maintaining the effective distance between said optics and said storage medium to achieve auto focusing, said optical passage being a tapered recess formed in said slider accommodating a converging beam from said optics, said tapered recess being formed by anisotropic preferential etching.

5. An optical data storage system, comprising
an optical data storage medium,
a movable optical head for delivering a directed energy beam to a spot on the storage medium, including
a slider flexibly suspended above said medium on an air bearing,
micro-focusing optics mounted on said slider, said slider having an optical passage defined between said optics and the storage medium, said optics being oriented to focus the energy beam through said optical passage onto a spot on the storage medium, said slider maintaining the effective distance between said optics and said storage medium to achieve auto focusing, said optical passage being a tapered recess formed in said slider accommodating a converging beam from said optics, said slider including a separate block in which said tapered recess is formed, said block is made of a crystalline material and said recess is formed by anisotropic preferential etching.

6. The system of claim 5, wherein said crystalline material is silicon.

7. An optical data storage system, comprising
an optical data storage medium,
a movable optical head for delivering a directed energy beam to a spot on the storage medium, including
a slider flexibly suspended above said medium on an air bearing,
micro-focusing optics mounted on said slider, said slider having an optical passage defined between said optics and the storage medium, said optics being oriented to focus the energy beam through said optical passage onto a spot on the storage medium, said slider maintaining the effective distance between said optics and said storage medium to achieve auto focusing, said optical passage being a tapered recess formed in said slider accommodating a converging beam from said optics, said storage medium having plural tracks and said tapered recess terminating, on the side of the slider facing the storage medium, in an exit aperture elongated in the cross-track direction.

8. The system of claim 7, further comprising a substantially flat electrical coil attached to the bottom of the slider surrounding said elongated exit aperture.

9. The system of claim 8, wherein said coil is a printed microcircuit immediately adjacent to and said exit aperture.

10. The system of claim 9, further comprising a separate fine tracking actuator for shifting the beam axis along a scanning direction parallel to the long axis of said exit aperture.

11. The system of claim 10, further comprising a reflector in said optical head, said fine tracking actuator acting to tilt said reflector.

12. The system of claim 7, wherein the storage medium has plural tracks, further/comprising a separate fine tracking actuator for shifting the beam axis to select different tracks on the storage medium.

13. The system of claim 7, wherein said focusing optics is a micro-objective lens.

14. The system of claim 13, wherein said objective lens is an aspheric singlet.

15. The system of claim 13, wherein said objective lens has a focal length of from 1 to 3 mm.

16. The system of claim 15, wherein said objective lens has a focal length of less than 2 mm.

17. The system of claim 15, wherein said objective lens has a focal length of about 2 mm.

18. The system of claim 13, wherein said lens has a focal length of about 1 ½ mm.

19. The system of claim 13, wherein said lens has a numerical aperture of from about 0.50 to about 0.65.

20. The system of claim 13, further comprising means for generating a collimated laser beam and for directing said beam via said optical head to said objective lens said beam having a diameter of from about 1 to about 3 mm.

21. The system of claim 20, wherein said beam diameter is approximately 1 ½ mm.

22. The system of claim 20, wherein said lens has a focal length of about 1.45 mm and a numerical aperture of about 0.55, and said beam diameter is approximately 1.6 mm.

23. The system of claim 20, wherein the focal length of said lens is about the same as said beam diameter.

24. The system of claim 13, wherein said objective lens has a mass of less than 35 milligrams.

* * * * *

UNITED STATES PATENT AND TRADEMARK OFFICE
CERTIFICATE OF CORRECTION

PATENT NO. : 5,105,408
DATED : April 14, 1992
INVENTOR(S) : Neville K. S. Lee, et. al.

It is certified that error appears in the above-indentified patent and that said Letters Patent is hereby corrected as shown below:

Column 1, line 9, "no pending" should read --now abandoned--.

Column 3, line 5, "disk 1." should read --disk 10.--.

Column 3, line 9, "bearings 2," should read --bearings 20,".

Column 3, line 42, "body 5" should read --body 50--.

Column 6, line 13, insert new paragraph after "mm)".

Column 8, line 31, claim 12, delete "/" after "further".

Signed and Sealed this

Nineteenth Day of October, 1993

Attest:

BRUCE LEHMAN

*Attesting Officer*     *Commissioner of Patents and Trademarks*